United States Patent
Takagi

(10) Patent No.: US 7,431,678 B2
(45) Date of Patent: Oct. 7, 2008

(54) HYDRAULIC PRESSURE CONTROL DEVICE FOR AUTOMATIC TRANSMISSION

(75) Inventor: Kiyoharu Takagi, Okazaki (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 394 days.

(21) Appl. No.: 11/340,589

(22) Filed: Jan. 27, 2006

(65) Prior Publication Data
US 2006/0172856 A1    Aug. 3, 2006

(30) Foreign Application Priority Data
Jan. 28, 2005    (JP)    ............... 2005-020619

(51) Int. Cl.
*B60W 10/00*    (2006.01)
*B60W 10/02*    (2006.01)
*B60W 10/04*    (2006.01)

(52) U.S. Cl. ........................ 477/180; 477/70

(58) Field of Classification Search .................. 477/70, 477/174, 180, 906
See application file for complete search history.

(56) References Cited

U.S. PATENT DOCUMENTS 6,865,965 B2 *   3/2005   Uchino ..................... 74/335
6,929,584 B2 *   8/2005   Miyata et al. ............ 477/119

2001/0009880 A1   7/2001   Suzuki et al.

FOREIGN PATENT DOCUMENTS

| JP | 2689421 B2 | 8/1997 |
| JP | 10-122349 A | 5/1998 |
| JP | 2000-035110 A | 2/2000 |
| JP | 2001-248721 A | 9/2001 |
| JP | 2001-248724 A | 9/2001 |

* cited by examiner

*Primary Examiner*—Tisha D Lewis
(74) *Attorney, Agent, or Firm*—Buchanan Ingersoll & Rooney PC

(57) ABSTRACT

There is provided a hydraulic pressure control device for an automatic transmission having a fail-safe mechanism to cope with an operation malfunction of electromagnetic valves. A first changeover valve that can be switched between a normal state where a drain port EX of each electromagnetic valve communicates with a predetermined drain destination and a failure state where the drain port EX and a predetermined hydraulic oil supply passage is disposed in a drain oil passage of clutches C1 and C2, and a second changeover valve that can be switched between a normal state where a supply port IN of each electromagnetic valve communicates with a predetermined hydraulic oil supply passage and a failure state where the supply port IN communicates with a predetermined drain destination is disposed in a supply oil passage of the other engaging elements. Even when an operation malfunction is caused in any of the electromagnetic valves, the corresponding changeover valve is operated to establish engagement of the clutches C1 and C2, thereby forming a given shift stage.

14 Claims, 2 Drawing Sheets

HYDRAULIC PRESSURE CONTROL DEVICE FOR AUTOMATIC TRANSMISSION

CROSS REFERENCE TO RELATED APPLICATIONS

This application is based on and claims priority under 35 U.S.C. §119 with respect to Japanese Application No. 2005-020619 filed on Jan. 28, 2005, the entire content of which is incorporated herein by reference.

BACKGROUND OF THE INVENTION

1. Field of the Invention

The present invention relates to a hydraulic pressure control device for an automatic transmission, and more specifically, to a hydraulic pressure control device for an automatic transmission provided with a plurality of sets of a friction engaging element and an electromagnetic valve to supply or discharge hydraulic oil to the friction engaging element.

2. Background Art

In recent years, realization of a smooth and highly-responsive gear shift feeling has been sought by a so-called clutch-to-clutch control method in which engagement and disengagement of clutches are performed simultaneously by directly supplying and cutting off oil from a hydraulic source by electromagnetic valves.

Hydraulic pressure control devices of automatic transmissions that realizes the above method have basically a hydraulic circuit configuration in which one electromagnetic valve is disposed in each of friction engaging elements and forms each shift stage by allowing two of the friction engaging elements to engage each other, except in the case where one-way clutch (O. W. C) for a first shift stage is used or where an electromagnetic magnetic valve is shared.

In the above configuration, it is necessary to assume that a so-called interlock occurs in which three or more of the friction engaging elements might engage one another due to a hardware failure or a software failure of the electromagnetic valves. Accordingly, in JP No. 2689421, four normally high type electromagnetic valves (whose output is ON at the time of disconnection or non-excitation and that is hereinafter also referred to as "NH") are used for four friction engaging elements, and fail-safe valves are provided between the friction engaging elements and the electromagnetic valves. If interlock occurs, communication between predetermined friction engaging elements and electromagnetic valves is cut off and the friction engaging elements are brought into communication with a drain, which results in disengagement of the friction engaging elements.

However, in the configuration of JP No. 2689421, all the electromagnetic valves are of normally high (NH) type. Therefore, if disconnection occurs, all the electromagnetic valves have an output in an ON state similar to an ON failure and the fail-safe valves operate. Thus, if sticking occurs at the fail-safe valves, it will result in interlocking. Accordingly, in JP-A No. 10-122349, a configuration is provided in which NH type electromagnetic valves are used for two friction engaging elements that form a given shift stage at the time of disconnection, normally low type electromagnetic valves (whose output is OFF at the time of disconnection or non-excitation and that is hereinafter also referred to as "NL") are used for the other friction engaging elements, and fail-safe valves are disposed between the NL electromagnetic valves and the friction engaging elements. According to this configuration, if disconnection occurs, a shift stage at the time of the disconnection is attained without operation of the fail-safe valves. In addition, if the NL type electromagnetic valves have failed in an ON state, the fail-safe valves operate so that the interlock can be prevented, similar to JP No. 2689421.

In JP No. 2689421 and JP-A No. 10-122349 described above, a configuration is disclosed in which oil is drained by disposing the fail-safe valves on the downstream side (on the side of the friction engaging elements) of the electromagnetic valves. However, in JP-A No. 2000-35110, the fail-safe valves are disposed on the upstream side of the electromagnetic valves, and if the fail-safe valves operate, disengagement of the friction engaging elements is performed by cutting off the supply pressure of the electromagnetic valves.

Further, in the configuration of JP-A No. 2001-248724, O. W. C. for a 1st shift stage is provided and four friction engaging elements and the O. W. C. for the 1st shift stage compose forward shift stages, but the fail-safe valves are disposed on the upstream side similar to JP-A No. 2001-35110. Further, in a configuration in which electromagnetic valves and control valves are combined together, even when the electromagnetic valves are normal, the control valves may stick (sticking of a valve member), which makes the output OFF. However, in JP-A No. 2001-248724, by making a configuration in which electromagnetic valves, control valves and changeover valves are combined together, the output can be made ON even when the control valves stick solely or the changeover valves stick solely. As a result, a vehicle can travel without the shift stage being changed to a neutral position (N) at the time of a failure.

DISCLOSURE OF THE INVENTION

Problem to be Solved by the Invention

However, in the configurations described in the above patent documents, although it is possible to overcome an ON failure of electromagnetic valves related to friction engaging elements that do not compose a shift stage at the time of disconnection by using the fail-safe valves, there is a problem that it is not possible to cope with a case where the electromagnetic valves composing a shift stage do not operate due to disconnection etc. Although sticking of the valves is considered in the above patent documents such as in JP-A No. 2001-248724, if the electromagnetic valves themselves cannot output hydraulic pressure, this results in an N (neutral) state in which only one friction engaging element is engaged, which makes traveling of the vehicle impossible.

In order to avoid this, after detecting a normal electromagnetic valve, this normal electromagnetic valve and the remaining electromagnetic valves may be used to compose a shift stage having small deceleration and large driving power. However, there is a problem that traveling performance may substantially change depending on the combination of the electromagnetic valves.

SUMMARY OF THE INVENTION

The present invention has been made in consideration of the above circumstances. It is therefore an object of the invention to provide a hydraulic pressure control device for an automatic transmission provided with a fail-safe mechanism to cope with an operation malfunction of each electromagnetic valve for composing a given shift stage.

According to the first aspect of the present invention, there is provided a hydraulic pressure control device for an automatic transmission provided with a plurality of sets of a friction engaging element and an electromagnetic valve to control supply and discharge of hydraulic oil to the friction engaging element and establishing shift stages by combinations of the friction engaging element to which the hydraulic oil has been supplied, comprising, a changeover valve communicating a drain port of a first electromagnetic valve with a drain destination in a state where the first electromagnetic valve is normal, and communicating the drain port with a hydraulic oil supply passage in a state where the first electromagnetic valve has failed, wherein, the first electromagnetic valve is same set with a first friction engaging element, the first electromagnetic valve outputs the hydraulic oil to the first friction engaging element so as to establish a predetermined shift stage when the second electromagnetic valve has failed.

Further, according to the second aspect of the present invention, there is provided a hydraulic pressure control device for an automatic transmission provided with, in addition to the first changeover valve, a second changeover valve communicating a supply port of a second electromagnetic valve with a hydraulic oil supply passage in a state where the second electromagnetic valve is normal, and communicating the supply port with the drain destination in a state where the second electromagnetic valve has failed, wherein, the first electromagnetic valve is same set with a first friction engaging element, the first electromagnetic valve outputs the hydraulic oil to the first friction engaging element so as to establish a predetermined shift stage when the first or the second electromagnetic valve has failed, the second electromagnetic valve is same set with a second friction engaging element, the first electromagnetic valve does not output the hydraulic oil to the second friction engaging element so as to establish a predetermined shift stage when the first the second electromagnetic valve has failed.

According to the present invention, there is provided a fail-safe configuration that can be preferably applied to a hydraulic pressure control device for an automatic transmission, particularly, a hydraulic pressure control device for an automatic transmission provided with electromagnetic valves that drive a number of friction engaging elements, respectively.

DESCRIPTION OF THE PREFERRED EMBODIMENTS

Figure 1:
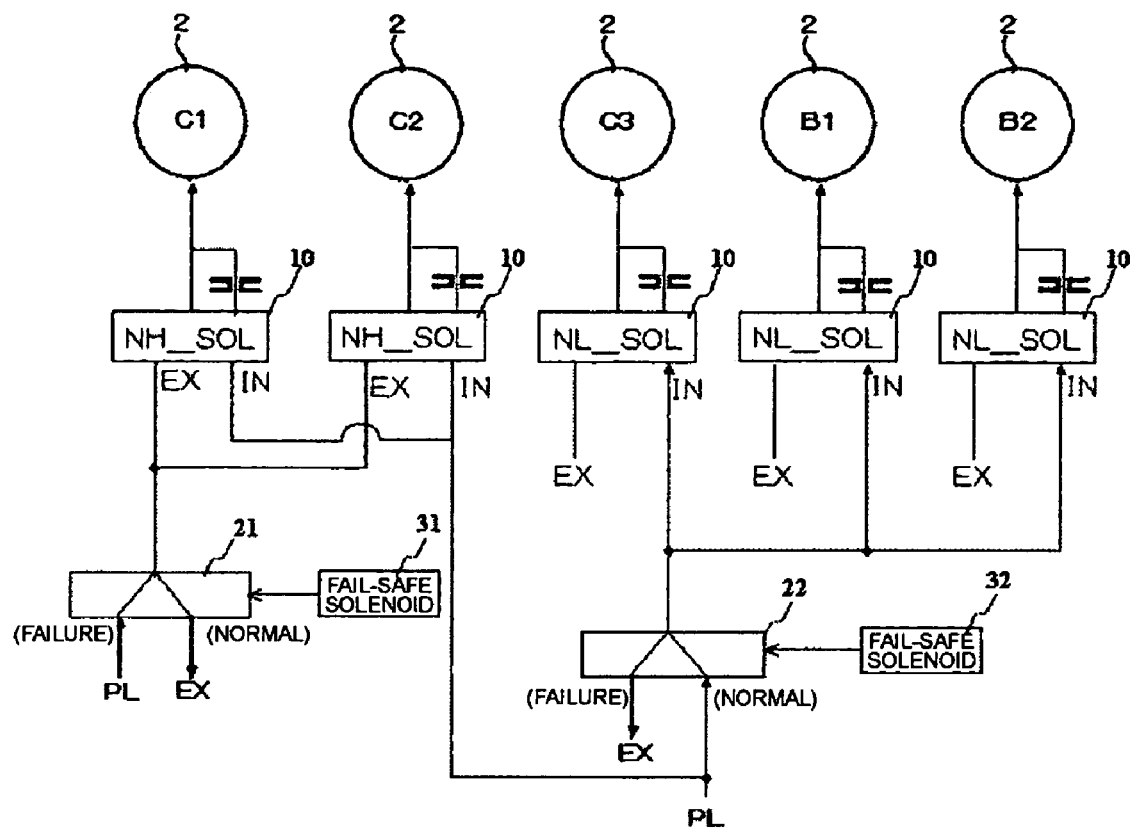
FIG. 1 is a view showing the circuit configuration of a hydraulic pressure control device for an automatic transmission relating to an embodiment of the invention.

In the following, a best mode for implementing the present invention will be described. FIG. 1 is a view showing an exemplary circuit configuration of a hydraulic pressure control device for an automatic transmission to which the invention is applied. Referring to FIG. 1, the hydraulic pressure control device includes three friction clutches C1, C2 and C3 and two friction brakes B1 and B2, all of which serve as friction engaging elements 2, and electromagnetic valves 10 that drive each of the friction clutches and brakes. FIG. 1 also shows a circuit configuration that can perform a so-called clutch-to-clutch control by a command from an ECU (not shown).

The circuit configuration of FIG. 1 is adapted to allow the friction clutches C1 and C2 engaged at the time of a failure, and normally high (normally open) type electromagnetic valves 10 are connected to the friction clutches C1 and C2, respectively, and normally low (normally closed) type electromagnetic valves 10 are connected to the other friction engaging elements, respectively. Also, a fail-safe valve (first changeover valve) 21 is connected to drain ports EX of the normally high (normally open) type electromagnetic valves 10, a fail-safe valve 22 (second changeover valve) is connected to supply ports IN of the normally low (normally closed) type electromagnetic valves 10.

Figure 2:
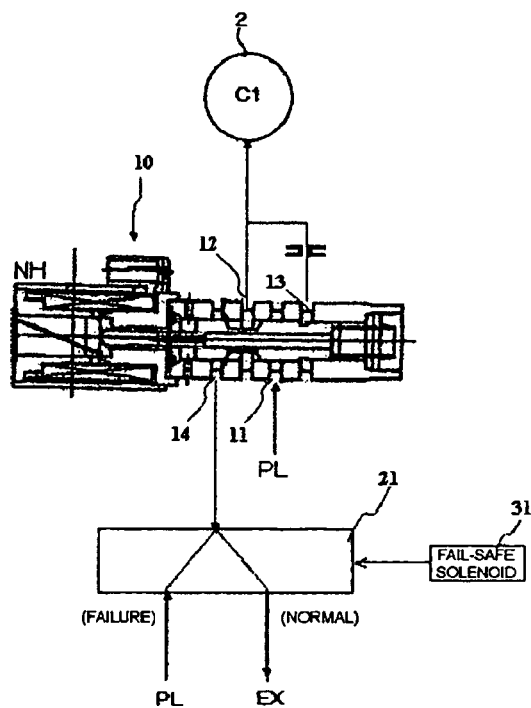
FIG. 2 is a view showing an exemplary configuration of a fail-safe valve and an electromagnetic valve that drive a friction engaging element engaged at the time of a failure.

FIG. 2 is a view showing an exemplary configuration of a fail-safe valve (first changeover valve) 21 and an electromagnetic valve 10 that drive a friction engaging element engaged at the time of a failure. Referring to FIG. 2, the electromagnetic valve 10 is composed of a direct pressure type linear solenoid valve having a supply port 11, an output port 12, a feedback port 13, and a drain port 14. The output port 12 is coupled with the friction clutch C1. Also, the supply port 11 of the linear solenoid valve 10 is coupled with a predetermined hydraulic source, and is supplied with a line pressure PL. The fail-safe valve (first changeover valve) 21 is connected to the drain port 14 of the linear solenoid valve 10.

The fail-safe valve (first changeover valve) 21 is adapted to be able to discharge oil from the drain port 14 of the linear solenoid valve 10 in a normal state in which the valve is biased by a spring or the like that is not shown. The fail-safe valve (first changeover valve) 21 is also connected to a predetermined hydraulic source, and at the time of an OFF failure, the valve is adapted to be switched to the failure side by a fail-safe solenoid 31 to be driven based on a failure signal so that a predetermined hydraulic pressure can be supplied to the drain port 14.

Figure 3:
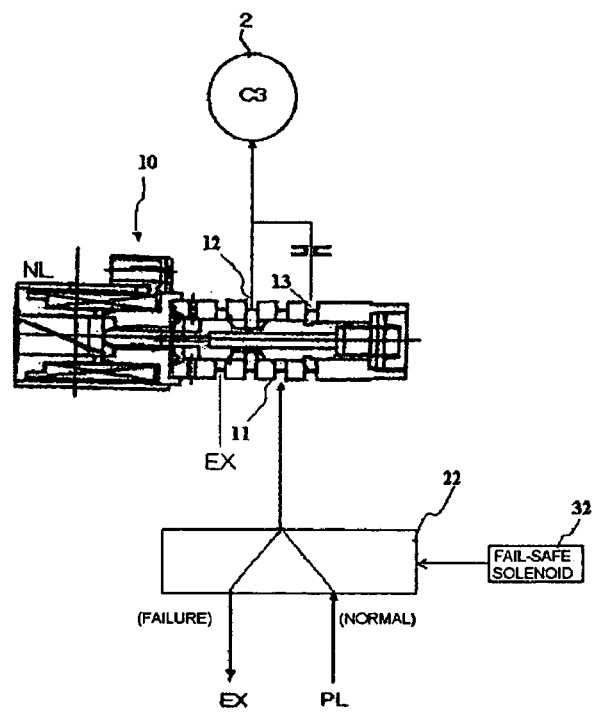
FIG. 3 is a view showing an exemplary configuration of a fail-safe valve and an electromagnetic valve that drive a friction engaging element not engaged at the time of a failure.

FIG. 3 is a view showing an exemplary configuration of a fail-safe valve (second changeover valve) 22 and an electromagnetic valve 10 that drive a friction engaging element not engaged at the time of a failure. Referring to FIG. 3, the electromagnetic valve 10 is also composed of a direct pressure type linear solenoid valve having a supply port 11, an output port 12, a feedback port 13, and a drain port 14. The output port 12 is connected to the friction clutch C3. Also, the drain port 14 of the linear solenoid valve 10 is connected to a predetermined drain destination so that oil can be discharged. The fail-safe valve (second changeover valve) 22 is disposed on the upstream side of the supply port 11 of the linear solenoid valve 10.

The fail-safe valve (second changeover valve) 22 is adapted to be able to supply oil by communicating the supply port 11 of the linear solenoid valve 10 with a predetermined hydraulic source in a normal state in which the valve is biased by a spring or the like that is not shown. The fail-safe valve (second changeover valve) 22 is also connected to a predetermined drain destination, and at the time of an ON failure or at the time of occurrence of interlock, the valve is adapted to be switched to the failure side by a fail-safe solenoid 32 to be driven based on a failure signal so that oil can be discharged from the supply port 11.

Next, the operation of the present embodiment will be described referring back to FIG. 1. According to the configuration of FIG. 1, even when any one of the electromagnetic valves undergoes an OFF failure, a vehicle can travel because the electromagnetic valves of types corresponding to the respective friction engaging elements are provided. Also, even when an OFF failure occurs in the normally high (NH-_SOL) type electromagnetic valves 10, by operating the fail-safe valve (first changeover valve) 21 toward the fail-safe side to cut off drain port 14 of the electromagnetic valves 10 from a drain oil passage, connect them to predetermined hydraulic sources, and supply hydraulic oil to both of the drain ports 14 and supply ports 11, it is possible to force the electromagnetic valves 10 to be turned on to perform engagement of the friction engaging elements.

Also, even when an ON failure occurs in the normally low (NL_SOL) type electromagnetic valves 10, in addition to an existing interlock prevention mechanism, by operating the fail-safe valve (second changeover valve) 22 toward the fail-safe side to cut off supply ports 11 of the electromagnetic valves 10 from a hydraulic oil supply passage, connect them to a predetermined drain destination, and drain hydraulic oil from the supply ports 11, it is possible to force the electromagnetic valves 10 to be turned off to perform disengagement of the friction engaging elements.

Further, according to the above configuration, compared with the conventional hydraulic pressure control device in which fail-safe valves are disposed at least between the electromagnetic valves and the friction engaging elements, it is possible to shorten the length of oil passages to the friction engaging elements, which becomes also advantageous to responsiveness of hydraulic oil and hydraulic vibration.

Although the present invention has been described in detail by illustrating a preferred embodiment thereof, the technical scope of the invention is not to be construed as limited to the particular embodiment. The present invention can also be implemented by changing structural details and particulars in various ways within the scope of the matters as defined in the claims. For example, although the above embodiment is explained for a case in which the direct pressure type linear solenoid valves are used, the invention can also be applied to a configuration in which friction engaging elements are driven by electromagnetic valves and control valves as well as electromagnetic valves having control valves, such as 3-way linear solenoids and the like.

Further, for convenience of explanation, although the above embodiment has been described in conjunction with the hydraulic pressure control device in which all the friction engaging elements have the electromagnetic valves 10, it is needless to say that all the friction engaging elements do not necessarily have such electromagnetic valves when O. W. C. (one-way clutches) are used or the friction engaging elements are shared.

Further, although the above embodiment has been described in conjunction with the hydraulic pressure control device in which the fail-safe valve (first changeover valve) is disposed in two friction engaging elements, that is, the friction clutches C1 and C2 so as to compose given a shift stage, the changeover valves may be constituted of multiple stages so that the shift stage can be selected according to vehicle conditions.

Further, although the above embodiment is explained for a case in which the normally high type and normally low type electromagnetic valves 10 are used, according to the principles of the invention, the fail-safe valves may be driven so as to compose given shift stages independently of the type (normally high type or normally low type) and the failure mode (an OFF failure or an ON failure) of the electromagnetic valves 10. Accordingly, it is possible to surely compose a shift stage in a configuration similar to JP No. 2689421 in which normally high type electromagnetic valves are all used, in a configuration similar to JP-A No. 10-122349 in which normally high type and normally low type electromagnetic valves are combined together, or in a configuration in which normally low type electromagnetic valves are all used. Moreover, at the time of an OFF failure of electromagnetic valves composing a given shift stage, if switching of the fail-safe valve (first changeover valve) is not made, it is also possible set to a neutral position (N).

Further, although the above embodiment is explained for a case in which fail-safe solenoids 31 and 32 that are operated by a failure signal are used to drive fail-safe valves, the fail-safe valves may be operated by deriving a signal oil pressure which indicates the state of other friction engaging elements. Further, since the failure signal to be supplied to the fail-safe solenoid 31 operates to disengage predetermined friction engaging elements, a signal to be used during gear shift can also be employed.

Further, although the description is omitted in the above embodiment and FIG. 1, it is needless to say that predetermined hydraulic sources to be connected to the respective electromagnetic valves 10 or fail-safe valves may be ones that can appropriately switch oil passages for every shift stage or for every range (DorR, etc.) and is not particularly limited if only a pressure that can drive at least the friction engaging elements can be obtained.

What is claimed is:

1. A hydraulic pressure control device for an automatic transmission provided with a plurality of sets of a friction engaging element and an electromagnetic valve to control supply and discharge of hydraulic oil to the friction engaging element and establishing shift stages by combinations of the friction engaging element to which the hydraulic oil has been supplied, comprising, a changeover valve communicating a drain port of a predetermined electromagnetic valve with a drain destination in a state where the predetermined electromagnetic valve is normal, and communicating the drain port with a hydraulic oil supply passage in a state where the predetermined electromagnetic valve has failed, wherein, the predetermined electromagnetic valve is same set with a predetermined friction engaging element, the predetermined electromagnetic valve outputs the hydraulic oil to the predetermined friction engaging element so as to establish a predetermined shift stage when the predetermined electromagnetic valve has failed.

2. The hydraulic pressure control device for an automatic transmission according to claim 1, wherein the predetermined electromagnetic valve is a normal high type electromagnetic valve which outputs hydraulic oil without power supply.

3. The hydraulic pressure control device for an automatic transmission according to claim 1, wherein when power supply to the predetermined electromagnetic valves has failed, the changeover valve communicates the drain port of the predetermined electromagnetic valve with the hydraulic oil supply passage to which line pressure is supplied from a hydraulic source.

4. The hydraulic pressure control device for an automatic transmission according to claim 2, wherein when power supply to the predetermined electromagnetic valves has failed, the changeover valve communicates the drain port of the predetermined electromagnetic valve with the hydraulic oil supply passage to which line pressure is supplied from a hydraulic source.

5. The hydraulic pressure control device for an automatic transmission according to claim 3, wherein the changeover valve is driven by a solenoid.

6. The hydraulic pressure control device for an automatic transmission according to claim 4, wherein the changeover valve is driven by a solenoid.

7. A hydraulic pressure control device for an automatic transmission that has a plurality of sets of a friction engaging element and an electromagnetic valve to control supply and discharge of hydraulic oil to the friction engaging element and establishing shift stages by combinations of the friction engaging element to which the hydraulic oil has been supplied, comprising, a first changeover valve communicating a drain port of a first electromagnetic valve with a drain destination in a state where the first electromagnetic valve is normal, and communicating the drain port with a hydraulic oil supply passage in a state where the first electromagnetic valve has failed, and a second changeover valve communicating a supply port of a second electromagnetic valve with a hydraulic oil supply passage in a state where the second electromagnetic valve is normal, and communicating the supply port with the drain destination in a state where the second electromagnetic valve has failed, wherein, the first electromagnetic valve is same set with a first friction engaging element, the first electromagnetic valve outputs the hydraulic oil to the first friction engaging element so as to establish a predetermined shift stage when the first or the second electromagnetic valve has failed, the second electromagnetic valve is same set with a second friction engaging element, the first electromagnetic valve does not output the hydraulic oil to the second friction engaging element so as to establish a predetermined shift stage when the first the second electromagnetic valve has failed.

8. The hydraulic pressure control device for an automatic transmission according to claim 7, wherein the first electromagnetic valve is a normal high type electromagnetic valve which outputs hydraulic oil without power supply, and the second electromagnetic valve is a normal low type electromagnetic valve which outputs hydraulic oil with power supply.

9. The hydraulic pressure control device for an automatic transmission according to claim 7, wherein when power supply to the first electromagnetic valve has failed, the first changeover valve communicates the drain port of the first electromagnetic valve with the hydraulic oil supply passage to which line pressure is supplied from a hydraulic source.

10. The hydraulic pressure control device for an automatic transmission according to claim 8, wherein when power supply to the first electromagnetic valve has failed, the first changeover valve communicates the drain port of the first electromagnetic valve with the hydraulic oil supply passage to which line pressure is supplied from a hydraulic source.

11. The hydraulic pressure control device for an automatic transmission according to claim 7, wherein the first changeover valve and the second changeover valve are driven by solenoids.

12. The hydraulic pressure control device for an automatic transmission according to claim 8, wherein the first changeover valve and the second changeover valve are driven by solenoids.

13. The hydraulic pressure control device for an automatic transmission according to claim 9, wherein the first changeover valve and the second changeover valve are driven by solenoids.

14. The hydraulic pressure control device for an automatic transmission according to claim 10, wherein the first changeover valve and the second changeover valve are driven by solenoids.

* * * * *